United States Patent
Park et al.

(10) Patent No.: US 12,346,934 B2
(45) Date of Patent: Jul. 1, 2025

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Sanghun Park, Suwon-si (KR); Wonkyun Kim, Suwon-si (KR); Hyesu Yeom, Suwon-si (KR); Seongmin Joe, Suwon-si (KR); Hyunwoo Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/383,643

(22) Filed: Oct. 25, 2023

(65) Prior Publication Data

US 2024/0054530 A1   Feb. 15, 2024

Related U.S. Application Data

(63) Continuation of application No. PCT/KR2023/005100, filed on Apr. 14, 2023.

(30) Foreign Application Priority Data

Jul. 12, 2022   (KR) .................. 10-2022-0085824

(51) Int. Cl.
  *G06Q 30/02*  (2023.01)
  *G06Q 30/0251*  (2023.01)
(52) U.S. Cl.
  CPC ..... *G06Q 30/0264* (2013.01); *G06Q 30/0255* (2013.01); *G06Q 30/0269* (2013.01)
(58) Field of Classification Search
  None
  See application file for complete search history.

(56) References Cited

U.S. PATENT DOCUMENTS

| 7,877,387 B2 | 1/2011 | Hangartner |
| 8,255,949 B1 | 8/2012 | Bayer et al. |

(Continued)

FOREIGN PATENT DOCUMENTS

| CN | 114282944 A | 4/2022 |
| CN | 114612155 A | 6/2022 |

(Continued)

OTHER PUBLICATIONS

International Search Report dated Jul. 24, 2023, issued by the International Searching Authority in International Application No. PCT/KR2023/005100 (PCT/ISA/210).

(Continued)

*Primary Examiner* — Vincent M Cao
(74) *Attorney, Agent, or Firm* — Sughrue Mion, PLLC (57) ABSTRACT

An electronic device includes a communicator; at least one memory storing information associated with a neural network model for predicting a target device for each time zone from a plurality of time zones for an advertising content; and at least one processor configured to: acquire, from a plurality of external devices, data corresponding to a use history of a user; acquire, based on the data corresponding to the use history, a plurality of feature values corresponding to a respective external device from the plurality of external devices by allocation of each feature value of the plurality of feature values to a respective time zone from the plurality of time zones, input the plurality of feature values into the neural network model, and acquire score information for a plurality of probabilities that the plurality of external devices are related to a label by allocation of each probability of the plurality of probabilities to a respective time zone from the plurality of time zones, identify, based on the score information, a plurality of target devices for providing the advertising content for each of the plurality of time zones, (Continued)

and control the communicator to transmit information on the advertising content to the plurality of target devices.

20 Claims, 6 Drawing Sheets

(56) References Cited

U.S. PATENT DOCUMENTS

| | | | |
|---|---|---|---|
| 8,635,103 | B1 | 1/2014 | West et al. |
| 9,681,159 | B2 | 6/2017 | Jain et al. |
| 10,108,983 | B2 | 10/2018 | Davis et al. |
| 10,242,386 | B2 | 3/2019 | Hong et al. |
| 10,346,871 | B2 | 7/2019 | Jeon et al. |
| 10,373,197 | B2 | 8/2019 | Jordon et al. |
| 11,023,525 | B2 | 6/2021 | Youn et al. |
| 11,438,430 | B2 | 9/2022 | Jo et al. |
| 11,651,392 | B2 | 5/2023 | Park et al. |
| 2013/0144709 | A1* | 6/2013 | Narasimhan ........... G06Q 30/02 715/733 |
| 2013/0238686 | A1* | 9/2013 | O'Donoghue ........ G06F 9/4451 709/203 |
| 2014/0236956 | A1 | 8/2014 | Matsuura et al. |
| 2016/0019465 | A1* | 1/2016 | Milton .................. H04W 4/029 706/52 |
| 2016/0182657 | A1* | 6/2016 | Mukherjee ............ H04L 67/535 709/223 |
| 2017/0142465 | A1* | 5/2017 | Ray ................. H04N 21/25883 |
| 2018/0225709 | A1* | 8/2018 | Ferber .................... G06N 20/00 |
| 2020/0219143 | A1* | 7/2020 | Mak ....................... G06Q 30/08 |
| 2021/0209491 | A1* | 7/2021 | Liu .................... G06Q 30/0631 |
| 2021/0235167 | A1* | 7/2021 | Park .................... G06Q 30/0255 |
| 2021/0287156 | A1* | 9/2021 | Rogynskyy ............. G06F 40/30 |
| 2021/0326674 | A1 | 10/2021 | Liu et al. |
| 2022/0198523 | A1 | 6/2022 | Jeong et al. |
| 2023/0021054 | A1 | 1/2023 | Tamura |
| 2023/0325876 | A1 | 10/2023 | Park et al. |

FOREIGN PATENT DOCUMENTS

| | | |
|---|---|---|
| JP | 2014-157513 A | 8/2014 |
| KR | 10-2011-0069245 A | 6/2011 |
| KR | 10-2017-0126698 A | 11/2017 |
| KR | 10-2019-0120494 A | 10/2019 |
| KR | 10-2020-0071327 A | 6/2020 |
| KR | 10-2218235 B1 | 2/2021 |
| KR | 10-2022-0042600 A | 4/2022 |
| KR | 10-2022-0088191 A | 6/2022 |
| KR | 10-2023-0135964 A | 9/2023 |
| WO | 2021/200018 A1 | 10/2021 |
| WO | 2021/251599 A1 | 12/2021 |

OTHER PUBLICATIONS

Communication dated Mar. 28, 2025 issued by the European Patent Office in European Patent Application No. 23839756.6.

* cited by examiner

| TIME ZONE | STARTING TIME | ENDING TIME | NUMBER OF THE USED DEVICES | RATIO OF THE USED DEVICES |
|---|---|---|---|---|
| NIGHT | 23 O'CLOCK | 2 O'CLOCK | 57,000 | 19% |
| DAWN | 2 O'CLOCK | 6 O'CLOCK | 20,000 | 7% |
| MORNING | 6 O'CLOCK | 10 O'CLOCK | 48,000 | 16% |
| AFTERNOON | 10 O'CLOCK | 17 O'CLOCK | 45,000 | 15% |
| EVENING | 17 O'CLOCK | 23 O'CLOCK | 130,000 | 43% |

FIG. 4

| TIME ZONE | RATIO OF THE USED DEVICES | FIRST DEVICE | SECOND DEVICE | THIRD DEVICE | FOURTH DEVICE | FIFTH DEVICE | ... | NTH DEVICE |
|---|---|---|---|---|---|---|---|---|
| FIRST TIME ZONE | 60% | 0.9 | 0.8 | 0.6 | 0.2 | 0.1 | ... | OMITTED |
| SECOND TIME ZONE | 20% | 0.1 | 0.8 | 0.1 | 0.2 | 0.1 | ... | OMITTED |
| THIRD TIME ZONE | 20% | 0.3 | 0.7 | 0.3 | 0.4 | 0.3 | ... | OMITTED |

# ELECTRONIC DEVICE AND CONTROLLING METHOD OF ELECTRONIC DEVICE

CROSS-REFERENCE TO RELATED APPLICATIONS

This application is a continuation of International Application No. PCT/KR2023/005100 designating the United States, filed on Apr. 14, 2023, in the Korean Intellectual Property Receiving Office and claiming priority to Korean Patent Application No. 10-2022-0085824 filed on Jul. 12, 2022, in the Korean Intellectual Property Office. The disclosures of each of these applications are incorporated by reference herein in their entireties.

BACKGROUND OF THE INVENTION

1. Field of the Invention

The disclosure relates to an electronic device and a controlling method of the electronic device, and more particularly, to an electronic device for effectively providing an advertising content to a user, and a controlling method thereof.

2. Description of the Related Art

As on-line advertising market has grown greatly, technologies for providing an appropriate advertising content to a user are developing. For example, the speed of development of advertisement targeting technologies for providing an advertising content to a user who has interest and intent for purchase for the advertised product is accelerating.

As a related art technology related to targeted advertising, there is a technology for heightening the conversion rate of a user based on the user's content viewing pattern, the user's taste information (e.g., preference information) for the product, etc. Furthermore, in particular, as technologies for the field of artificial intelligence (AI) have developed recently, there have been continuous attempts for more effectively identifying a target device which becomes a subject of advertisement exposure by using a neural network model and deep learning.

However, regarding these related art technologies, the use patterns of a user device for each time zone are not being sufficiently considered, thereby limiting the effectiveness for these technologies. For example, according to the conventional technologies, an advertising content is provided without consideration of different users using one user device for each time zone, and even in a situation where one user uses one user device, the advertisement conversion rate of the user may vary according to which time zone the advertising content is provided, etc. Accordingly, the advertisement conversion rate may deteriorate, and accordingly, advertisement costs may be wasted.

SUMMARY OF THE INVENTION

Provided are an electronic device for effectively providing an advertising content by considering use patterns of a user device for each time zone, and a controlling method thereof.

According to an aspect of the disclosure, an electronic device includes: a communicator; at least one memory storing information associated with a neural network model for predicting a target device for each time zone from a plurality of time zones for an advertising content; and at least one processor configured to: acquire, from a plurality of external devices, data corresponding to a use history of a user; acquire, based on the data corresponding to the use history, a plurality of feature values corresponding to a respective external device from the plurality of external devices by allocation of each feature value of the plurality of feature values to a respective time zone from the plurality of time zones, input the plurality of feature values into the neural network model, and acquire score information for a plurality of probabilities that the plurality of external devices are related to a label by allocation of each probability of the plurality of probabilities to a respective time zone from the plurality of time zones, identify, based on the score information, a plurality of target devices for providing the advertising content for each of the plurality of time zones, and control the communicator to transmit information on the advertising content to the plurality of target devices.

The at least one processor may be further configured to: acquire information on a number of external devices corresponding to the label among the plurality of external devices by allocation each external device from the plurality of external devices to a respective time zone from the plurality of time zones, and identify, based on the score information and the information on the number of the external devices corresponding to the label, the plurality of target devices for each of the plurality of time zones.

The at least one processor may be further configured to: allot, based on the information on the number of the external devices corresponding to the label, a number of target devices to each of the plurality of time zones, and identify the plurality of target devices for each of the plurality of time zones based on an identification of the external devices having a highest score information up to the number of allotted target devices for each of the plurality of time zones.

The at least one processor may be further configured to: identify a time zone from the plurality of time zones having a number of the of allotted target devices that is smaller than a predetermined threshold value, and determine the advertising content is not to be provided in the identified time zone.

The data corresponding to the use history of the user may include information on use times of the plurality of external devices, information on applications used by the user of the plurality of external devices, and information on contents viewed by the user.

The at least one processor may be further configured to: receive the data corresponding to the use history of the user, information on a profile of the user, and information on a product preference of the user through the communicator, and acquire, based on the data corresponding to the use history of the user, the information on the profile of the user, and the information on the product preference of the user, the plurality of feature values by allocation of each feature value from the plurality of feature values to a respective time zone from the plurality of time zones.

The plurality of feature values may be acquired in forms of feature vectors after being allocated to the plurality of time zones.

According to an aspect of the disclosure, a controlling method of an electronic device, includes: acquiring data corresponding to a use history of a user from a plurality of external devices; acquiring, based on the data corresponding to the use history, a plurality of feature values corresponding to a respective external device from the plurality of external devices by allocating each feature value from the plurality of feature values to a respective time zone from a plurality of time zones; inputting the plurality of feature values into a neural network model for predicting a target device for each time zone for an advertising content, and acquiring score information for a plurality of probabilities that the plurality of external devices are related to a label by allocating each probability from the plurality of probabilities to a respective time zone from the plurality of time zones; identifying, based on the score information, a plurality of target devices for providing the advertising content for each of the plurality of time zones; and transmitting information on the advertising content to the plurality of target devices.

The identifying the plurality of target devices may include: acquiring information on a number of external devices corresponding to the label among the plurality of external devices by allocating each external device from the plurality of external devices to a respective time zone from the plurality of time zones; and identifying, based on the score information and the information on the number of the external devices corresponding to the label, the plurality of target devices for each of the plurality of time zones.

The identifying the plurality of target devices may further include: allotting, based on the information on the number of the external devices corresponding to the label, a number of target devices to each of the plurality of time zones; and identifying the plurality of target devices for each of the plurality of time zones based on an identification of the external devices having a highest score information up to the number of allotted target devices for each of the plurality of time zones.

The controlling method may further include: identifying a time zone from the plurality of time zones having a number of the of allotted target devices that is smaller than a predetermined threshold value; and determining the advertising content is not to be provided in the identified time zone.

The data corresponding to the use history of the user may include information on use times of the plurality of external devices, information on applications used by the user of the plurality of external devices, and information on contents viewed by the user.

The acquiring the plurality of feature values may include: receiving the data corresponding to the use history of the user, information on a profile of the user, and information on a product preference of the user from the plurality of external devices; and acquiring, based on the data corresponding to the use history of the user, the information on the profile of the user, and the information on the product preference of the user, the plurality of feature values by dividing the values by each of the plurality of time zones.

The plurality of feature values may be acquired in forms of feature vectors after being divided in predetermined period units.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include various modifications, equivalents, and/or alternatives of the embodiments of the disclosure. Also, with respect to the detailed description of the drawings, similar components may be designated by similar reference numerals.

Also, in describing the disclosure, in case it is determined that detailed explanation of related known functions or features may unnecessarily confuse the gist of the disclosure, the detailed explanation will be omitted.

In addition, the embodiments described below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Also, the terms used in the disclosure are used only to explain specific embodiments, and are not intended to limit the scope of the disclosure. Further, singular expressions include plural expressions, unless defined differently in the context.

In addition, in the disclosure, expressions such as "have," "may have," "include," and "may include" denote the existence of such characteristics (e.g.: elements such as numbers, functions, operations, and components), and do not exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) only A, (2) only B, or (3) both A and B.

In addition, the expressions "first," "second" and the like used in the disclosure may describe various elements regardless of any order and/or degree of importance. Also, such expressions are used only to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g., a third element).

In contrast, the description that one element (e.g., a first element) is "directly coupled" or "directly connected" to another element (e.g., a second element) can be interpreted to mean that still another element (e.g., a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

Further, in the embodiments of the disclosure, 'a module' or 'a part' may perform at least one function or operation, and may be implemented as hardware or software, or as a combination of hardware and software. Furthermore, a plurality of 'modules' or 'parts' may be integrated into at least one module and implemented as at least one processor, excluding 'a module' or 'a part' that needs to be implemented as specific hardware.

Various elements and areas in the drawings were illustrated schematically. Accordingly, the technical idea of the disclosure is not limited by the relative sizes or intervals illustrated in the accompanying drawings.

Hereinafter, the embodiments according to the disclosure will be described in detail with reference to the accompanying drawings, such that those having ordinary skill in the art to which the disclosure belongs can easily carry out the disclosure.

Figure 1:
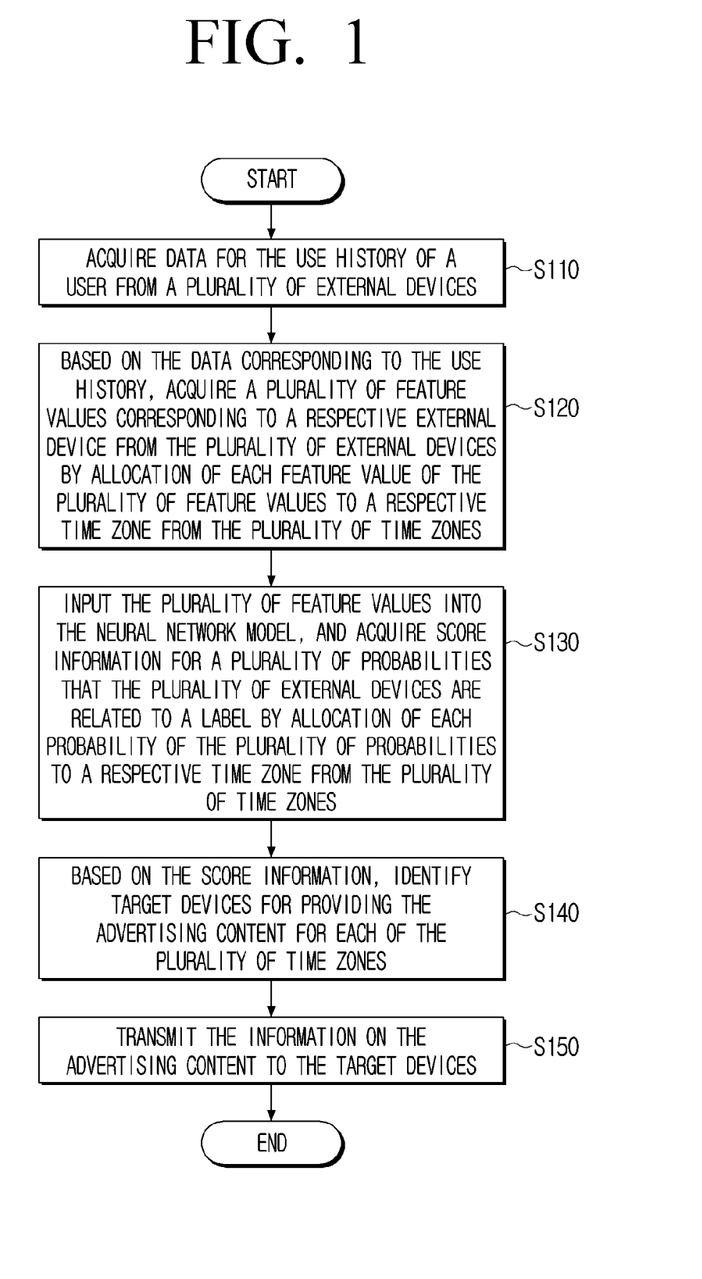
FIG. 1 is a flow chart illustrating a controlling method of an electronic device according to one or more embodiments of the disclosure.

FIG. 1 is a flow chart illustrating a controlling method of an electronic device 100 according to one or more embodiments of the disclosure.

The electronic device 100 according to the disclosure refers to a device for predicting target devices for each time zone for an advertising content. An example electronic device will be described in further detail with respect to FIG. 5. In one or more examples, the electronic device 100 may predict target devices for providing a specific advertising content among a plurality of external devices connected to the electronic device 100, and transmit information on the advertising content to the predicted target devices. For example, the electronic device 100, according to the present disclosure, may be implemented as a server for managing provision of advertisements. However, as understood by one of ordinary skill in the art, the electronic device 100 is not limited to a server and may be any suitable device known to one of ordinary skill in the art such as a computer, laptop, tablet, smartphone, etc.

As illustrated in FIG. 1, the electronic device 100, according to one or more embodiments of the disclosure, may acquire data corresponding to the use history of a user from the plurality of external devices in operation S110.

In one or more examples, the plurality of external devices may refer to external devices which become subjects for provision of a content according to the disclosure. For example, the plurality of external devices may be implemented as one of a TV, a smartphone, or a tablet PC. However, these devices are merely examples, and the types of the plurality of external devices may include any suitable device known to one or ordinary skill in the art.

In one or more examples, the term 'the data corresponding to the use history of a user' may be used for generally referring to data for the history of a user of using the plurality of external devices. Specifically, the data corresponding to the use history of a user may include at least one of information on the use times of the plurality of external devices, information on applications used by the user of the plurality of external devices, or information on contents viewed by the user.

For example, in case the electronic device 100 is a TV, the data corresponding to the use history of a user may include the user's viewing history of TV programs, the user's use history of the TV's applications, and the user's use history of devices connected to the TV, etc. Any additional information that indicates a user's use patterns or characteristics of external devices may be included in the data corresponding to the use history of a user according to the disclosure.

The disclosures describe embodiments using data corresponding to the use history of a user. However, as understood by one or ordinary skill in the art, various kinds of information such as information on a user's profile (e.g., a user's gender, age, etc.) or information on a user's product preference (e.g., information on products that a user purchased, etc.), or any other information known to one of ordinary skill in the art may be used.

In operation S120, based on the data corresponding to the use history, the electronic device 100 may determine a plurality of feature values corresponding to a respective external device from the plurality of external devices by allocating each feature value from the plurality of feature values to a respective time zone from the plurality of time zones.

According to one or more embodiments, the data corresponding to the use history may be formatted such that the data may be used in learning of a neural network model. For example the electronic device 100 may acquire a plurality of feature values corresponding to each of the plurality of external devices by converting (or embedding) the data corresponding to the use history into feature vectors. In the process of acquiring the plurality of feature values, pre-processing processes such as processing, deletion, and extraction, etc. of the data may be performed.

In one or more examples, the electronic device 100, according to the disclosure, may acquire the plurality of feature values by dividing the feature values by each of a plurality of predefined time zones. For example, the plurality of time zones may include at least one of information on the days of the week or information on the times constituting a day. For example, the plurality of time zones may be a result of dividing 24 hours constituting a plurality of days into morning, afternoon, evening, night, and early morning according to a predetermined standard, or may be a result of dividing a week according to the days of the week, and then dividing each day according to a predetermined standard. Furthermore, the plurality of time zones may be defined by various methods according to a system developer or a user's setting.

According to one or more embodiments, the electronic device 100 may determine the plurality of feature values by allocating each of the feature values to a respective time zone from the plurality of time zones based on the data corresponding to the use history of the user, information on the user's profile, and information on the user's product preference.

According to one or more embodiments, the plurality of feature values may be acquired in forms of feature vectors after being divided in predetermined period units. For example, in order to minimize inclusion of sparse data in the data for learning of the neural network model, the electronic device 100 may aggregate the data corresponding to the use history while dividing the data in predetermined period units (e.g.: one month), and then acquire the plurality of feature values.

In operation S130, the electronic device 100 may input the plurality of feature values into the neural network model, and acquire score information for probabilities that the plurality of external devices are related to a predetermined label by allocating each score to a respective time zone from the plurality of time zones.

In one or more examples, the term 'label' may refer to a characteristic (or a feature, a pattern, etc.) that may become the standard of advertisement targeting in the use history of the user. For example, the label may indicate at least one of information that the user used a specific application or information that the user viewed a content of a specific genre. For example, the label may be set as "the user used a game app," or may be set as "the user viewed a war movie."

According to one or more embodiments, the label may not only include at least one of the information that the user used a specific application or the information that the user viewed a content of a specific genre, but may also further include information that limits a specific time zone among the plurality of time zones. For example, the label may be set as "the user used a game app in the early morning."

The neural network model, according to one or more embodiments, may refer to a neural network model trained to acquire score information for identifying target devices that become subjects for provision of an advertising content. For example, when the plurality of feature values corresponding to the plurality of external devices are acquired and a predetermined label is set as described above, the neural network model may calculate the probabilities that the plurality of external devices are related to the set label, normalize the calculated probabilities, and output the normalized calculated probabilities as the score information.

In one or more examples, regarding the neural network model according to the disclosure, separate learning processes may be performed for each of the plurality of time zones. For example, the separate learning processes may include acquiring score information for the probabilities that the plurality of external devices are related to a predetermined label in the first time zone based on a feature value according to the use history in the first time zone, and acquiring score information for the probabilities that the plurality of external devices are related to the predetermined label in the second time zone based on a feature value according to the use history in the second time zone.

The neural network model, according to the one or more embodiments of the disclosure, may refer to an artificial intelligence model including a neural network, where the artificial intelligence model may be trained by deep learning. The neural network model, according to one or more embodiments of the disclosure, may include neural networks of various types such as a deep neural network (DNN), a convolutional neural network (CNN), a recurrent neural network (RNN), and generative adversarial networks (GAN), etc. However, as understood by one of ordinary skill in the art, the type of the neural network may include any type of neural network known to one of ordinary skill in the art.

In operation S140, the electronic device 100 may identify a plurality of target devices for providing an advertising content for each of the plurality of time zones based on the score information in operation S140.

According to one or more embodiments, the electronic device 100 may organize the plurality of external devices in the plurality of target devices in an order starting with the highest score information acquired for each of the plurality of time zones. For example, the number of the target devices may be determined according to a request of an advertisement to expose an advertising content to the user. In identifying the number of target devices among the plurality of external devices, the electronic device 100 may identify the devices having higher score information acquired for each of the plurality of time zones as the target devices.

Various embodiments related to the process of acquiring score information and the process of identifying target devices according to the disclosure will be described in more detail with reference to FIG. 4.

In operation S150, when the plurality of target devices are identified, the electronic device 100 may transmit information on the advertising content to the plurality of target devices. For example, the electronic device 100 may transmit information on a time zone for providing the advertising content together with information on the advertising content to the plurality of target devices, thereby enabling the plurality of target devices to output the advertising content output in the time zone.

According to the one or more embodiments described above with reference to FIG. 1, the electronic device 100 may provide an advertising content to appropriate target devices for each time zone in consideration of the user's use patterns of the plurality of external devices for each time zone, and accordingly, the conversion rate of the user for the advertising content is advantageously improved.

In particular, according to one or more embodiments of the disclosure, when there are different users using one external device for each time zone, an appropriate advertising content is provided in consideration of the use patterns for each time zone, and thus, advertisement targeting appropriate for each of the plurality of users using the one external device may be performed. Furthermore, when one user uses one user device, precise advertisement targeting in consideration of the user's use pattern for each time zone may be performed. A time zone may correspond to one or more time intervals within a set time period. For example, if the set time period is a 24 hour day, the associated time zones may be morning, afternoon, evening, early morning, etc. Accordingly, the efficiency of providing an advertising content can be improved, and this can lead to reduction of the advertising cost and improvement of advertising profitability.

Figure 2:
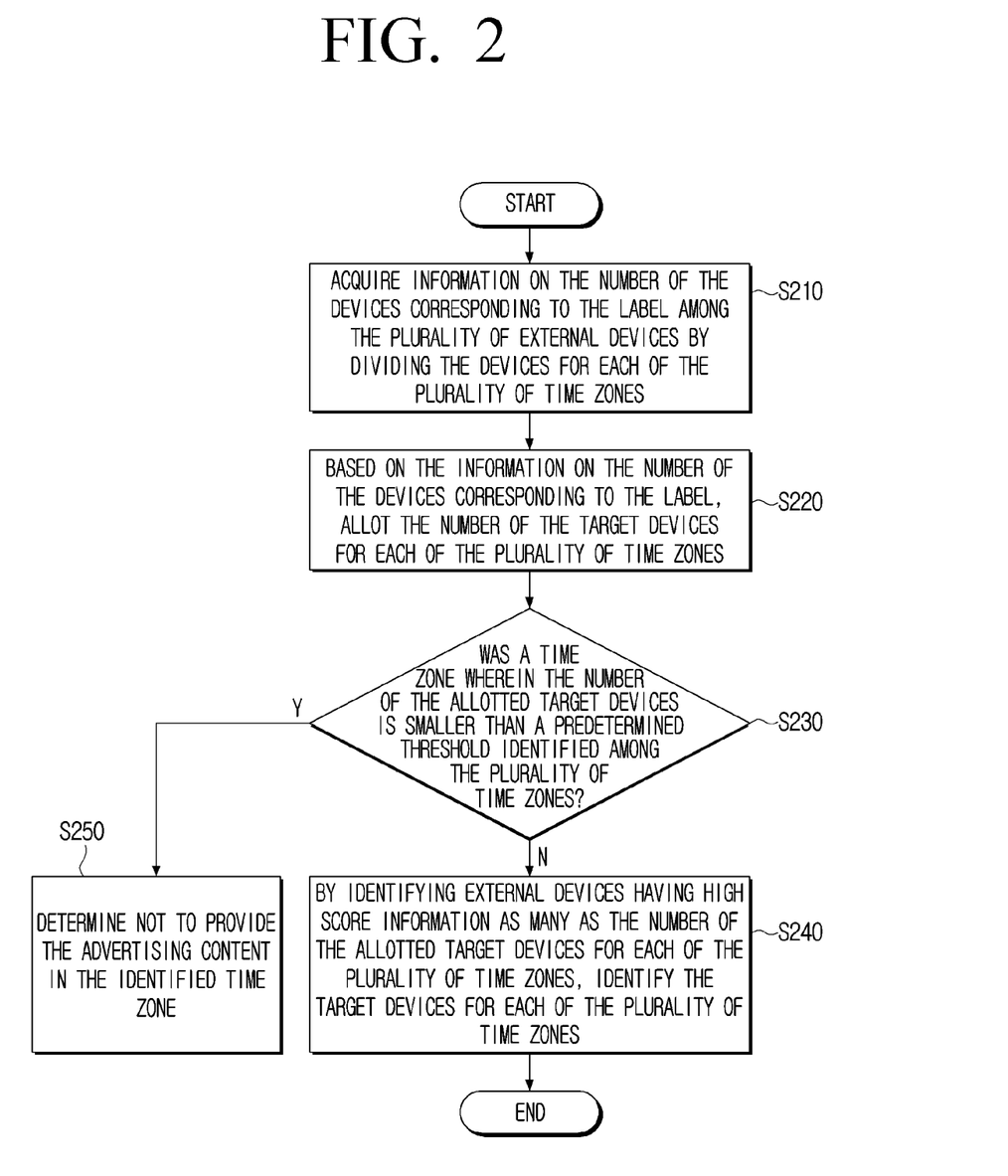
FIG. 2 is a flow chart illustrating a controlling method of an electronic device according to one or more embodiments of the disclosure.
Figure 3:
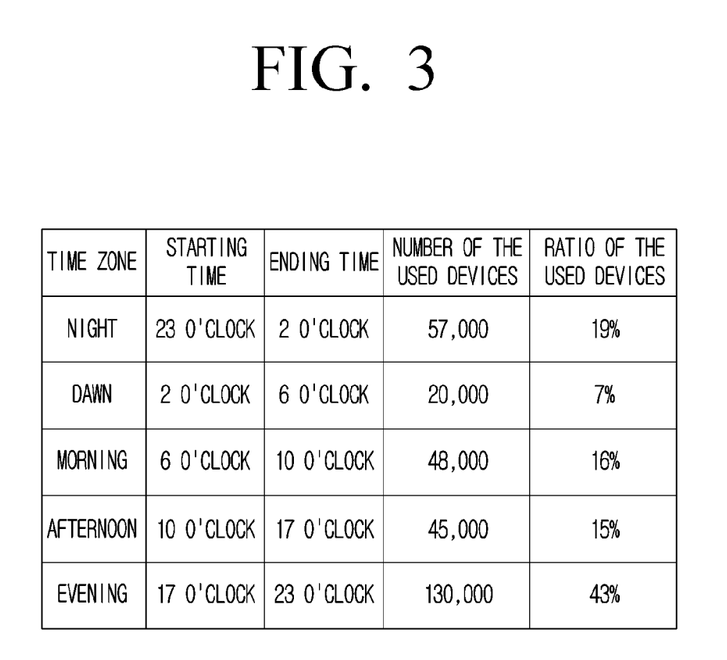
FIG. 3 is a diagram for illustrating in detail standards for dividing a plurality of time zones and a process of identifying the number of used devices corresponding to the label according to one or more embodiments of the disclosure.

FIG. 2 is a flow chart illustrating a controlling method of the electronic device 100 according to one or more embodiments of the disclosure. FIG. 3 is a diagram for illustrating in detail standards for dividing a plurality of time zones and a process of identifying the number of used devices corresponding to the label according to one or more embodiments of the disclosure.

The process illustrated in FIG. 2 is directed to the process of identifying the plurality of target devices. The process illustrated in FIG. 2 may be performed based on the premise that score information regarding each of the plurality of external devices for each time zone was acquired through the neural network model as described above in the description regarding FIG. 1.

The process illustrated in FIG. 2 may further be performed based on the premise of a case where the plurality of time zones were divided, and the number of the used devices corresponding to the label was identified as in the embodiment in FIG. 3.

Referring to FIG. 3, the plurality of time zones according to the disclosure may include, for example, a night time zone, an early morning time zone, a morning time zone, an afternoon time zone, and an evening time zone. As illustrated in FIG. 3, the starting time and the ending time of the night time zone may be 23:00 to 2:00 of the next day. For example, 23:00 of the starting time corresponds to the time from 23:00:00, and 2:00 of the ending time corresponds to the time before 2:00:00. Furthermore, the starting time and the ending time of the early morning time zone may be 2:00 to 6:00, and the starting time and the ending time of the morning time zone may be 6:00 to 10:00, and the starting time and the ending time of the afternoon time zone may be 10:00 to 17:00, and the starting time and the ending time of the evening time zone may be 17:00 to 23:00.

In operation S210, the electronic device 100 may acquire information on the number of the devices corresponding to the label among the plurality of external devices by allocating each device to a respective time zone from the plurality of time zones in operation S210. For example, the electronic device 100 may identify the devices corresponding to the predetermined label among the plurality of external devices based on the data corresponding to the use history of the user, and thereby calculate the number of the devices corresponding to the label for each of the plurality of time zones. In one or more examples, the devices corresponding to the label may refer to the devices that satisfy the standard or the characteristic specified at the label among the plurality of external devices.

For example, in case the label is set as "the user used a game app," the electronic device 100 may identify the devices which have the history that "the user used a game app" among the plurality of external devices, and identify "the time when the user used the game app" based on the data corresponding to the use history of the user. Accordingly, referring to FIG. 3, the electronic device 100 may identify that the numbers of the used devices in the night time zone, early morning time zone, morning time zone, afternoon time zone, and evening time zone. For example, "the numbers of the devices wherein the user used the game app" for the night time zone, early morning time zone, morning time zone, afternoon time zone, and evening time zone may be 570,000, 200,000, 480,000, 450,000, and 1,300,000, respectively. In one or more examples, if the numbers of the used devices for each time zone are expressed as ratios, these numbers for the night time zone, early morning time zone, morning time zone, afternoon time zone, and evening time zone become 19%, 7%, 16%, 15%, and 43%, respectively.

In operation S220, the electronic device 100 may allot the number of target devices for each time zone in the plurality of time zones based on the information on the number of the devices corresponding to the label. For example, the electronic device 100 may allot a predetermined number of the entire target devices according to the ratio of the number of the devices corresponding to the label for each of the plurality of time zones. The predetermined number of the entire target devices may refer to the number of the entire target devices where the advertising content is to be exposed (e.g., displayed). The predetermined number of the entire target devices may be determined according to a number of times the advertising content is exposed or displayed according to the request of the advertiser.

For example, when the label is set as "the user used a game app," and the numbers of the devices which have the history that the user used a game app in the night time zone, early morning time zone, morning time zone, afternoon time zone, and evening time zone are 570,000, 200,000, 480,000, 450,000, and 1,300,000, respectively, the electronic device 100 may allot 600,000, which corresponds to the number of the entire target devices, into 114,000, 40,000, 96,000, 90,000, and 260,000 for the night time zone, early morning time zone, morning time zone, afternoon time zone, and evening time zone, respectively.

In operation S230, the electronic device 100 may identify a time zone where the number of the allotted target devices is smaller than a predetermined threshold value among the plurality of time zones. Hereinafter, description is made based on the example of a case wherein the threshold value is 500,000. However, the threshold value according to the disclosure may be changed according to an advertiser's request or the developer's setting.

If a time zone where the number of the allotted target devices is smaller than the predetermined threshold value is not identified among the plurality of time zones in operation S230-N (e.g., "N" branch of operation S230), the electronic device 100 may identify, up to a number of the allotted target devices for each of the plurality of time zones, external devices having high score information, and thereby identify the target devices for each of the plurality of time zones in operation S240.

For example, when the number of the entire target devices is 600,000, the target devices may be allotted as 300,000, 240,000, and 60,000 in the first time zone, the second time zone, and the third time zone, respectively. The electronic device 100 may identify 300,000 target devices having high score information in the first time zone, identify 240,000 target devices having high score information in the second time zone, and identify 60,000 target devices having high score information in the third time zone.

If a time zone where the number of the allotted target devices is smaller than the predetermined threshold value is identified among the plurality of time zones in operation S230-Y (e.g., "Y" branch of operation S230), the electronic device 100 may determine not to provide the advertising content in the identified time zone in operation S250.

For example, the electronic device 100 may not identify target devices in a time zone where the number of the allotted target devices is smaller than the predetermined threshold value among the plurality of time zones, and re-allot the number of the target devices allotted in the time zone where the number of the allotted target devices is smaller than the predetermined threshold value to the number of the allotted target devices in the remaining time zones, and thereby identify the final number of the target devices.

For example, when the number of the entire target devices is 600,000 are allotted as 300,000, 240,000, and 60,000 in the first time zone, the second time zone, and the third time zone, respectively, the electronic device 100 may identify 333,333 target devices having high score information in the first time zone, identify 266,667 target devices having high score information in the second time zone, and may not identify target devices in the third time zone (e.g., 60,000 devices is below the threshold and therefore, allocated to the other time zones).

According to the embodiments described above with reference to FIG. 2 and FIG. 3, the electronic device 100 may identify appropriate target devices for each time zone in consideration of the use patterns of a plurality of users for each time zone. Also, in case the use ratio for a specific time zone is smaller than a threshold value, the electronic device 100 may perform control such that the advertisement is not exposed (e.g., displayed) in the time zone, thereby improving the efficiency of providing the advertising content.

Figure 4:
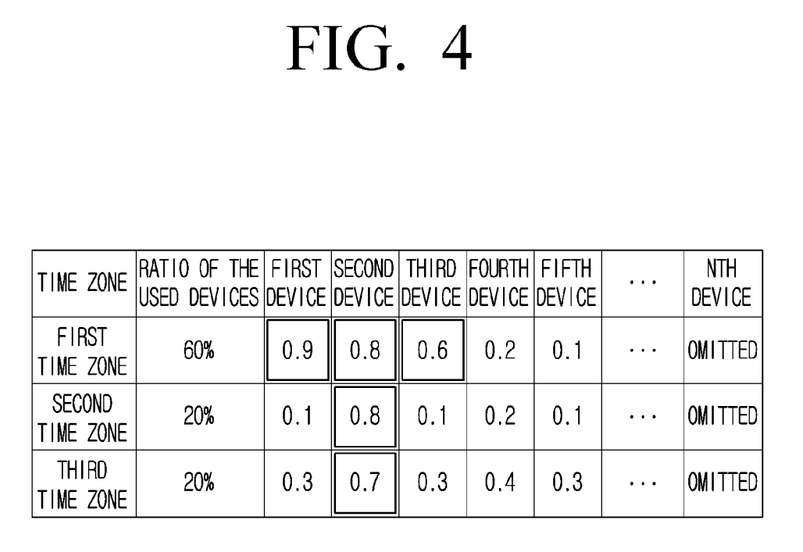
FIG. 4 is a diagram for illustrating in detail a process of acquiring score information and a process of identifying target devices according to one or more embodiments of the disclosure.

FIG. 4 is a diagram for illustrating in detail a process of acquiring score information and a process of identifying target devices, according to one or more embodiments of the disclosure.

As illustrated in FIG. 4, the plurality of time zones may include the first time zone, the second time zone, and the third time zone. Furthermore, the label may be set as "the user used a game app." Furthermore, the ratios of the devices having the history that the user used the game app in the first time zone, the second time zone, and the third zone may be 60%, 20%, and 20%, respectively.

In the explanation regarding FIG. 4, the number of the plurality of external devices according to the disclosure may be n, where n is a positive integer. However, for the convenience of explanation, the embodiments illustrated in FIG. 4 are described based on the premise that only five external devices, (e.g., the first device, the second device, the third device, the fourth device, and the fifth device exist). Furthermore, for the convenience of explanation, the embodiments illustrated in FIG. 4 are described based on premise that the number of the entire target devices according to the request of the advertiser is also five.

According to the embodiments illustrated in FIG. 4, the electronic device 100 may acquire 0.9, 0.8, 0.6, 0.2, and 0.1 as the score information of the first device, the second device, the third device, the fourth device, and the fifth device, respectively, in the first time zone through the neural network model. Furthermore, the electronic device 100 may acquire 0.1, 0.8, 0.1, 0.2, and 0.1 as the score information of the first device, the second device, the third device, the fourth device, and the fifth device, respectively, in the second time zone through the neural network model. Further, the electronic device 100 may acquire 0.3, 0.7, 0.3, 0.4, and 0.3 as the score information of the first device, the second device, the third device, the fourth device, and the fifth device, respectively, in the third time zone through the neural network model.

In one or more examples, the electronic device 100 may allot the number of the target devices for each of the plurality of time zones based on the information on the number of the devices corresponding to the label, or allot the number of the target devices for each of the plurality of time zones by using only the score information without consideration of the information on the number of the devices corresponding to the label.

According to one or more embodiments, the electronic device 100 may allot the number of the target devices for each of the plurality of time zones based on the number of the devices corresponding to the label. For example, in the embodiments illustrated in FIG. 4, the number of the entire target devices may be 5, and the electronic device 100 may allot the target devices as three, one, and one in the first time zone, the second time, and the third time zone, respectively, based on the fact that the ratios of the used devices in each of the first time zone, the second time zone, and the third time zone (e.g., "the ratios of the devices wherein the user used the game app") are 60%, 20%, and 20%, respectively. Subsequently, the electronic device 100 may identify the first device, the second device, and the third device, which are three devices in the order of highest to lowest in score information in the first time zone (e.g., indicated by square boxes in FIG. 4, the same hereinafter) as the target devices, and identify the second device, which is one device having the highest score information in the second time zone and the second device, which is one device having the highest score information in the third time zone, as the target devices.

According to one or more embodiments, the electronic device 100 may allot the number of the target devices for each of the plurality of time zones by using only the score information without considering the information on the number of the devices corresponding to the label. For example, in the embodiments illustrated in FIG. 4, the electronic device 100 may identify the first device in the first time zone, the second device in the first time zone, the third device in the third time zone, the second device in the second time zone, and the second device in the third time zone as five devices in the order of having the highest score information in the entire score information acquired for each of the plurality of time zones as the target devices.

Figure 5:
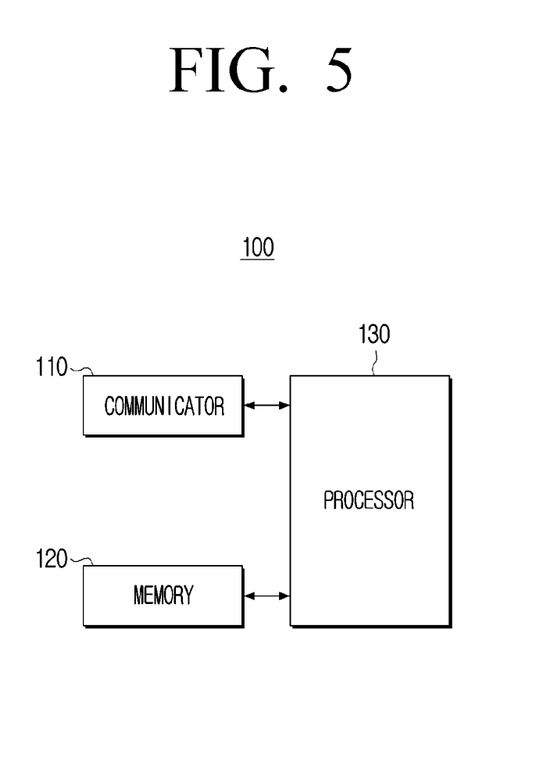
FIG. 5 is a block diagram schematically illustrating a configuration of an electronic device according to one or more embodiments of the disclosure.
Figure 6:
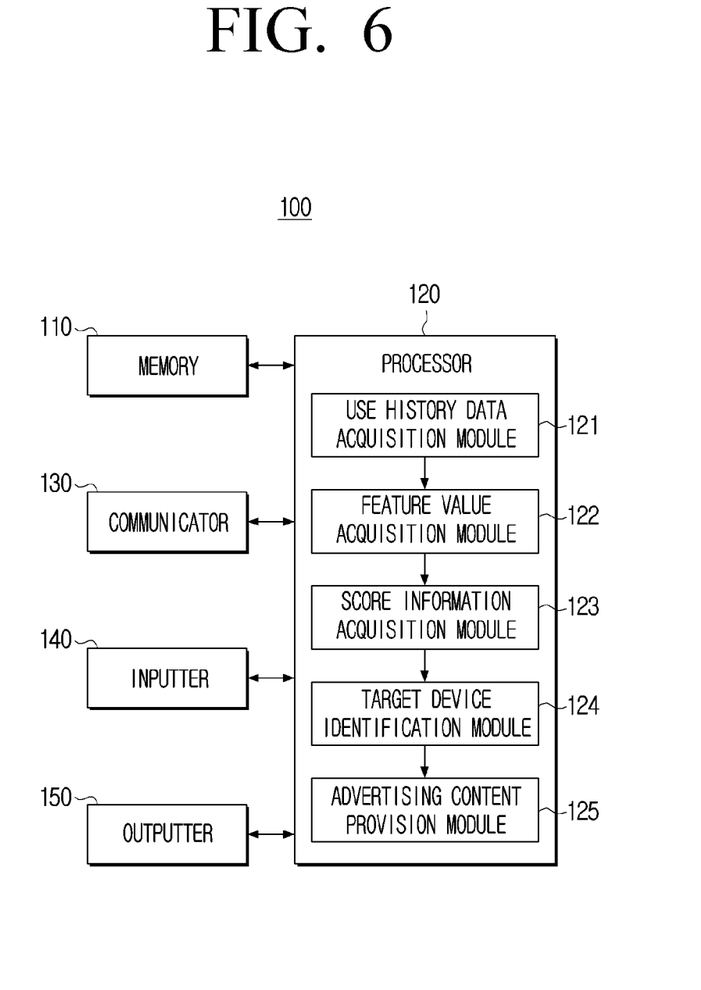
FIG. 6 is a block diagram illustrating in detail a configuration of an electronic device according to one or more embodiments of the disclosure.

FIG. 5 is a block diagram schematically illustrating a configuration of the electronic device 100 according to one or more embodiments of the disclosure. Also, FIG. 6 is a block diagram illustrating in detail a configuration of the electronic device 100 according to one or more embodiments of the disclosure.

As illustrated in FIG. 5, the electronic device 100, according to one or more embodiments of the disclosure, includes a communicator 110, a memory 120, and a processor 130. Furthermore, as illustrated in FIG. 6, the electronic device 100, according to one or more embodiments of the disclosure, may further include an inputter 140 and an outputter 150. However, the components as illustrated in FIG. 5 and FIG. 6 are merely examples, and as understood by one of ordinary skill in the art, new components may be added in addition to the components as illustrated in FIG. 5 and FIG. 6, or some components may be omitted.

In one or more examples, in the memory 120, at least one instruction regarding the electronic device 100 may be stored. Furthermore, in the memory 120, an operating system (O/S) for operating the electronic device 100 may be stored. Furthermore, in the memory 120, various kinds of software programs or applications for the electronic device 100 to operate according to the various embodiments of the disclosure may be stored. Additionally, the memory 120 may include a semiconductor memory such as a flash memory, or a magnetic storage medium such as a hard disk, etc.

For example, in the memory 120, various kinds of software modules for the electronic device 100 to operate according to the various embodiments of the disclosure may be stored, and the processor 130 may control the operations of the electronic device 100 by executing the various kinds of software modules stored in the memory 120. For example, the memory 120 may be accessed by the processor 130, and reading/recording/correction/deletion/update, etc. of data by the processor 130 may be performed.

In one or more examples, the term memory 120 may be used as a meaning including the memory 120, a ROM (not shown) or a RAM (not shown) inside the processor 130, or a memory card (not shown) (e.g., a micro SD card, a memory stick) mounted on the electronic device 100.

In particular, in the various embodiments according to the disclosure, in the memory 120, information on an advertising content, information on a neural network model, data corresponding to the use history of a user, a plurality of feature values, information on a predetermined label, score information, information on identified target devices, etc. may be stored. In one or more examples, various kinds of information may be stored in the memory 120 within a range for achieving the purpose of the disclosure, and the information stored in the memory 120 may be updated as it is received from an external device or input by the user.

The processor 130 may control the overall operations of the electronic device 100. For example, the processor 130 may be connected with the components of the electronic device 100 including the communicator 110 and the memory 120, and may control the overall operations of the electronic device 100 by executing at least one instruction stored in the memory 120 as described above.

The processor 130 may be implemented in various methods. For example, the processor 130 may be implemented as at least one of an application specific integrated circuit (ASIC), an embedded processor, a microprocessor, a hardware control logic, a hardware finite state machine (FSM), or a digital signal processor (DSP). Meanwhile, in the disclosure, the term processor 130 may be used as a meaning including a central processing unit (CPU), a graphic processing unit (GPU), and a main processing unit (MPU), etc.

According to one or more embodiments, the processor 130 may acquire data corresponding to the use history of a user from a plurality of external devices. Then, the processor 130 may determine a plurality of feature values corresponding to each of the plurality of external devices by allocating each feature value from the plurality of feature values to a respective time zone from the plurality of predefined time zones based on the data corresponding to the use history. In particular, the processor 130 may determine the plurality of feature values by allocating each feature value from the plurality of feature values to a respective time zone from the plurality of predefined time zones.

The processor 130 may input the plurality of feature values into the neural network model, and acquire score information for probabilities that the plurality of external devices are related to a predetermined label by allocating each score to a respective time zone from the plurality of time zones. In one or more examples, the label may indicate at least one of information that the user used a specific application or information that the user viewed a content of a specific genre.

Based on the score information, the processor 130 may identify a plurality of target devices for providing an advertising content for each of the plurality of time zones. According to one or more embodiments, the processor 130 may include a plurality of external devices in the plurality of target devices in the order of having higher score information acquired for each of the plurality of time zones among the plurality of external devices.

The processor 130 may control the communicator 110 (e.g., communication circuitry) to transmit information on the advertising content to the plurality of target devices. For example, the processor 130 may control the communicator 110 to transmit information on the time zone for providing the advertising content together with the information on the advertising content to the plurality of target devices. In one or more examples, the processor 130 may control the plurality of target devices to output advertising content in the time zone.

According to one or more embodiments, the processor 130 may acquire information on the number of the devices corresponding to the label among the plurality of external devices by allocating each device from the plurality of devices to the plurality of time zones, and identify the plurality of target devices for each of the plurality of time zones based on the score information and the information on the number of the devices corresponding to the label.

The processor 130 may allot the number of the target devices for each of the plurality of time zones based on the information on the number of the devices corresponding to the label, and identify external devices having high score information as many as the number of the allotted target devices for each of the plurality of time zones, and thereby identify the plurality of target devices for each of the plurality of time zones.

In one or more examples, if a time zone having a number of allotted target devices that is smaller than a predetermined threshold value is identified among the plurality of time zones, the processor 130 may determine not to provide the advertising content in the identified time zone.

The control process by the processor 130 may be implemented through a plurality of modules according to the disclosure. As illustrated in FIG. 6, the plurality of modules, according to one or more embodiments of the disclosure, may include a use history data acquisition module 121, a feature value acquisition module 122, a score information acquisition module 123, a target device identification module 124, and an advertising content provision module 125. Each of the plurality of modules may be implemented as a hardware module or a software module. Furthermore, information on the plurality of modules may be stored in the memory 120, and the processor 130 may implement the embodiments according to the disclosure through the plurality of modules by loading the information on the plurality of modules stored in the memory 120. The use history data acquisition module 121 may refer to a module that can acquire data corresponding to the use history of the user. For example, the use history data acquisition module 121 may acquire the data corresponding to the use history of the user by receiving the data from the plurality of external devices through the communicator 110.

The feature value acquisition module 122 may refer to a module that may acquire the plurality of feature values corresponding to each of the plurality of external devices. For example, when the data corresponding to the use history of the user is acquired through the use history data acquisition module 121, the feature value acquisition module 122 may determine the plurality of feature values by allocating each feature value from the plurality of feature values to a respective time zone from a plurality of predefined time zones. In one or more embodiments, the plurality of feature values may be acquired after pre-processing processes such as processing, deletion, and extraction, etc. of the data corresponding to the use history of the user are preformed through the feature value acquisition module 122.

The score information acquisition module 123 may refer to a module that may acquire score information for each of the plurality of external devices. Specifically, when the plurality of feature values are acquired through the feature value acquisition module 122, the score information acquisition module 123 may acquire score information for the probabilities that the plurality of external devices are related to a predetermined label by using the neural network model.

The target device identification module 124 may refer to a module that may identify a plurality of target devices for providing the advertising content for each time zone based on the score information. For examples, when the score information is acquired through the score information acquisition module 123, the target device identification module 124 may allot the number of the target devices for each of the plurality of time zones based on the information on the number of the devices corresponding to the label, or allot the number of the target devices for each of the plurality of time zones by using only the score information without considering the information on the number of the devices corresponding to the label.

The advertising content provision module 125 may refer to a module that may transmit the information on the advertising content to the plurality of target devices. For example, when the information on the plurality of target devices is acquired through the target device identification module 124, the advertising content provision module 125 may control the communicator 110 to transmit the information on the advertising content to the plurality of target devices. Furthermore, the advertising content provision module 125 may transmit information on the time zone for providing the advertising content together with the information on the advertising content to the plurality of target devices, and thereby make the advertising content output in the time zone by the plurality of target devices.

As the other embodiments according to the disclosure based on control by the processor 130 were described above with reference to FIG. 1 to FIG. 4, overlapping explanation regarding the same content is omitted.

The communicator 110 may include a circuit, and may perform communication with an external device. For example, the processor 130 may receive various kinds of data or information from an external device connected through the communicator 110, or transmit various kinds of data or information to an external device.

The communicator 110 may include at least one of a WiFi module, a Bluetooth module, a wireless communication module, an NFC module, or an ultra-wide band (UWB) module. For example, each of the WiFi module and the Bluetooth module may perform communication by a WiFi method and a Bluetooth method, respectively. In the case of using a WiFi module or a Bluetooth module, various types of connection information such as an SSID, etc. is transmitted and received first, and connection of communication is performed by using the information, and various types of information can be transmitted and received thereafter.

Furthermore, a wireless communication module may perform communication according to various communication protocols such as IEEE, Zigbee, 3rd Generation (3G), 3rd Generation Partnership Project (3GPP), LTE (Long Term Evolution), 5th Generation (5G), etc. Furthermore, the NFC module may perform communication by a near field communication (NFC) method of using a 13.56 MHz band among various RF-ID frequency bands such as 135 kHz, 13.56 MHz, 433 MHz, 860-960 MHz, and 2.45 GHz, etc. In addition, a UWB module may accurately measure Time of Arrival (ToA), which is the time when a pulse reaches a target, and Angle of Arrival (AoA), which is a pulse arrival angle at a transmitter device through communication between UWB antennas, and accordingly, the UWB module can perform precise distance and location recognition in an error range of within ranges of centimeters (cm) indoors.

In particular, in the various embodiments according to the disclosure, the processor 130 may receive data corresponding to the use history of the user, information on the user's profile, and information on the user's product preference, etc., from the plurality of external devices through the communicator 110. The processor 130 may control the communicator 110 to transmit information on an advertising content to the plurality of target devices. The processor 130 may control the communicator 110 to transmit the information on the time zone for providing the advertising content together with the information on the advertising content to the plurality of target devices.

The inputter 140 may include a circuit, and the processor 130 may receive a user instruction for controlling the operations of the electronic device 100 through the inputter 140. For example, the inputter 140 may consist of components such as a microphone, a camera, and a remote control signal receiver (not shown), etc. Furthermore, the inputter 140 may be implemented in a form of being included in the display as a touch screen. In particular, the microphone may receive a voice signal, and convert the received voice signal into an electronic signal.

In particular, according to the various embodiments of the disclosure, the processor 130 may receive a user input for transmitting an advertising content to the plurality of target devices through the inputter 140. Furthermore, the processor 130 may receive information on the standard for dividing each of the plurality of time zones, information on the number of the target devices, information on the predetermined threshold value, etc., according to the disclosure through the inputter 140.

The outputter 150 may include a circuit, and the processor 130 may output various functions that the electronic device 100 can perform through the outputter 150. Furthermore, the outputter 150 may include at least one of a display, a speaker, or an indicator.

The display may output image data by control by the processor 130. For example, the display may output an image stored in advance in the memory 120 by control by the processor 130. In particular, the display, according to one or more embodiments of the disclosure may display a user interface stored in the memory 120. The display may be implemented as a liquid crystal display panel (LCD), organic light emitting diodes (OLED), etc., and the display can also be implemented as a flexible display, a transparent display, etc. depending on cases. However, the display according to the disclosure is not limited to a specific type. The speaker may output audio data by control by the processor 130, and the indicator may be turned on by control by the processor 130.

In particular, according to the various embodiments of the disclosure, the processor 130 may display various kinds of information such as score information for each of the plurality of time zones and information on the plurality of target devices for each time zone through the outputter 150. Furthermore, the processor 130 may display a guide message indicating that information on the advertising content was transmitted to the plurality of target devices through the outputter 150.

Furthermore, the controlling method of the electronic device 100 according to the embodiments described above may be implemented as a program and provided to the electronic device 100. In particular, the program including the controlling method of the electronic device 100 may be provided while being stored in a non-transitory computer readable medium.

Specifically, in a non-transitory computer readable medium including a program executing the controlling method of the electronic device 100, the controlling method of the electronic device 100 may include the steps of acquiring data corresponding to the use history of a user from a plurality of external devices, and based on the data corresponding to the use history, acquiring a plurality of feature values corresponding to each of the plurality of external devices by dividing the feature values by each of a plurality of predefined time zones, and inputting the plurality of feature values into a neural network model for predicting a target device for each time zone for an advertising content, and acquiring score information for probabilities that the plurality of external devices will be related to a predetermined label by dividing the scores for each of the plurality of time zones, and based on the score information, identifying a plurality of target devices for providing the advertising content for each of the plurality of time zones, and transmitting information on the advertising content to the plurality of target devices.

The various embodiments regarding the electronic device 100 may be applied to the controlling method of the electronic device 100, and the computer readable recording medium including a program executing the controlling method of the electronic device 100.

According to the various embodiments of the disclosure as described above, the electronic device 100 may provide an advertising content to appropriate target devices for each time zone in consideration of the user's use patterns of the plurality of external devices for each time zone, and accordingly, the conversion rate of the user for the advertising content can be noticeably improved.

In particular, according to the disclosure, in case there are different users using one external device for each time zone, an appropriate advertising content is provided in consideration of the use patterns for each time zone, and thus, advertisement targeting appropriate for each of the plurality of users using one external device can be performed. Furthermore, in case one user uses one user device, precise advertisement targeting in consideration of the user's use pattern for each time zone can be performed. Accordingly, the efficiency of providing an advertising content may be improved, thereby leading to reduction of the advertising cost and improvement of advertising profitability.

Functions related to the neural network model as described above can be performed through the memory 120 and the processor 130.

The processor 130 may consist of one or a plurality of processors 130. Here, the one or plurality of processors 130 may be generic-purpose processors 130 such as a CPU, an AP, etc., graphic-dedicated processors 130 such as a GPU, a VPU, etc., or artificial intelligence-dedicated processors 130 such as an NPU.

The one or plurality of processors 130 perform control to process input data according to predefined operation rules or an artificial intelligence model stored in the non-volatile memory 120 and the volatile memory 120. The predefined operation rules or the artificial intelligence model are characterized in that they are made through learning.

In one or more examples, being made through learning may refer to applying a learning algorithm to a plurality of learning data, and predefined operation rules or an artificial intelligence model having desired characteristics are thereby made. Such learning may be performed in a device itself where artificial intelligence is performed according to the disclosure, or through a separate server/system.

An artificial intelligence model may include a plurality of neural network layers. Each layer has a plurality of weight values, and performs an operation of the layer through the operation result of the previous layer and an operation of the plurality of weight values. As examples of a neural network, there are a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), deep Q-networks, or any other suitable neural network known to one of ordinary skill in the art.

A learning algorithm may be a method of training a specific subject device (e.g., a robot) by using a plurality of learning data and thereby making the specific subject device make a decision or make prediction by itself. As examples of learning algorithms, there are supervised learning, unsupervised learning, semi-supervised learning, reinforcement learning, or any other learning algorithm known to one of ordinary skill in the art.

A storage medium that is readable by machines may be provided in the form of a non-transitory storage medium. In one or more examples, the term 'non-transitory' only means that a storage medium is a tangible device, and does not include signals (e.g.: electromagnetic waves), and the term does not distinguish a case wherein data is stored in the storage medium semi-permanently and a case wherein data is stored in the storage medium temporarily. For example, 'a non-transitory storage medium' may include a buffer wherein data is stored temporarily.

According to one or more embodiments, methods according to the various embodiments disclosed herein may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or distributed directly between two user devices (e.g., smartphones), or on-line (e.g.: download or upload) through an application store (e.g., Play Store™). In the case of on-line distribution, at least a portion of a computer program product (e.g., a downloadable app) may be stored in a storage medium readable by machines such as the server of the manufacturer, the server of the application store, and the memory 120 of the relay server at least temporarily, or may be generated temporarily.

Furthermore, each of the components according to the various embodiments of the disclosure described above (e.g., a module or a program) may consist of a singular object or a plurality of objects. Further, among the aforementioned corresponding sub components, some sub components may be omitted, or other sub components may be further included in the various embodiments. Alternatively or additionally, some components (e.g., a module or a program) may be integrated as an object, and perform the functions that were performed by each of the components before integration identically or in a similar manner.

Operations performed by a module, a program, or other components according to the various embodiments may be executed sequentially, in parallel, repetitively, or heuristically. Or, at least some of the operations may be executed in a different order or omitted, or other operations may be added.

Furthermore, the term "part" or "module" used in the disclosure may include a unit consisting of hardware, software, or firmware, and may be interchangeably used with, for example, terms such as a logic, a logical block, a component, or a circuit. In addition, "a part" or "a module" may be a component constituted as an integrated body or a minimum unit or a part thereof performing one or more functions. For example, a module may be constituted as an application-specific integrated circuit (ASIC).

Furthermore, the various embodiments of the disclosure may be implemented as software including instructions stored in machine-readable storage media, which can be read by machines (e.g., computers). The machines refer to devices that call instructions stored in a storage medium, and can operate according to the called instructions, and the devices may include an electronic device according to the aforementioned embodiments (e.g., an electronic device 100).

In case an instruction is executed by a processor, the processor may perform a function corresponding to the instruction by itself, or by using other components under its control. An instruction may include a code that is generated or executed by a compiler or an interpreter.

Furthermore, the disclosure is not limited to the aforementioned embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic device comprising:
a communicator;
at least one memory storing information associated with a trained neural network model for predicting a target device for each time zone from a plurality of time zones for an advertising content, each time zone associated with a different time interval; and
at least one processor configured to:
acquire, from a plurality of external devices, data corresponding to a use history of a user the use history comprising information on use times of the plurality of external devices;
acquire, based on the data corresponding to the use history, a plurality of feature values corresponding to a respective external device from the plurality of external devices by allocation of each feature value of the plurality of feature values to a respective time zone from the plurality of time zones,
input the plurality of feature values into the trained neural network model, and acquire, from the trained neural network model, score information for a plurality of probabilities that the plurality of external devices are related to a label by allocation of each probability of the plurality of probabilities to a respective time zone from the plurality of time zones,
predict, based on the score information, a plurality of target devices to be used and execute one or more applications by the user for each of the plurality of time zones based on an identification of the external devices having a highest score information for each of the plurality of time zones, and
control the communicator to transmit information on the advertising content to the plurality of target devices predicted to be used and execute the one or more applications by the user for each of the plurality of time zones.

2. The electronic device of claim 1, wherein the at least one processor is further configured to:
acquire information on a number of external devices corresponding to the label among the plurality of external devices by allocation each external device from the plurality of external devices to a respective time zone from the plurality of time zones, and
identify, based on the score information and the information on the number of the external devices corresponding to the label, the plurality of target devices for each of the plurality of time zones.

3. The electronic device of claim 2, wherein the at least one processor is further configured to:
allot, based on the information on the number of the external devices corresponding to the label, a number of target devices to each of the plurality of time zones, and
predict the plurality of target devices to be used and execute the one or more applications for each of the plurality of time zones based on an identification of the external devices having the highest score information up to the number of allotted target devices for each of the plurality of time zones.

4. The electronic device of claim 3, wherein the at least one processor is further configured to:
identify a time zone from the plurality of time zones having a number of the allotted target devices that is smaller than a predetermined threshold value, and
determine the advertising content is not to be provided in the identified time zone.

5. The electronic device of claim 1, wherein the data corresponding to the use history of the user further comprises information on applications used by the user of the plurality of external devices and information on contents viewed by the user.

6. The electronic device of claim 1, wherein the at least one processor is further configured to:
receive the data corresponding to the use history of the user, information on a profile of the user, and information on a product preference of the user through the communicator, and
acquire, based on the data corresponding to the use history of the user, the information on the profile of the user, and the information on the product preference of the user, the plurality of feature values by allocation of each feature value from the plurality of feature values to a respective time zone from the plurality of time zones.

7. The electronic device of claim 1, wherein the plurality of feature values are acquired in forms of feature vectors after being allocated to the plurality of time zones.

8. A controlling method of an electronic device, the controlling method comprising:
acquiring data corresponding to a use history of a user from a plurality of external devices, the use history comprising information on use times of the plurality of external devices;
acquiring, based on the data corresponding to the use history, a plurality of feature values corresponding to a respective external device from the plurality of external devices by allocating each feature value from the plurality of feature values to a respective time zone from a plurality of time zones, each time zone associated with a different time interval;
inputting the plurality of feature values into a trained neural network model for predicting a target device for each time zone for an advertising content, and acquiring, from the trained neural network model, score information for a plurality of probabilities that the plurality of external devices are related to a label by allocating each probability from the plurality of probabilities to a respective time zone from the plurality of time zones;
predicting, based on the score information, a plurality of target devices to be used and execute one or more applications by the user for each of the plurality of time zones based on an identification of the external devices having a highest score information for each of the plurality of time zones; and
transmitting information on the advertising content to the plurality of target devices predicted to be used and execute the one or more applications by the user for each of the plurality of time zones.

9. The controlling method of an electronic device of claim 8, wherein the identifying the plurality of target devices comprises:

acquiring information on a number of external devices corresponding to the label among the plurality of external devices by allocating each external device from the plurality of external devices to a respective time zone from the plurality of time zones; and identifying, based on the score information and the information on the number of the external devices corresponding to the label, the plurality of target devices for each of the plurality of time zones.

10. The controlling method of an electronic device of claim 9, wherein the identifying the plurality of target devices further comprises:

allotting, based on the information on the number of the external devices corresponding to the label, a number of target devices to each of the plurality of time zones; and predicting the plurality of target devices to be used and execute the one or more applications by the user for each of the plurality of time zones based on an identification of the external devices having the highest score information up to the number of allotted target devices for each of the plurality of time zones.

11. The controlling method of an electronic device of claim 10, further comprising:

identifying a time zone from the plurality of time zones having a number of the allotted target devices that is smaller than a predetermined threshold value; and determining the advertising content is not to be provided in the identified time zone.

12. The controlling method of an electronic device of claim 8, wherein the data corresponding to the use history of the user further comprises information on applications used by the user of the plurality of external devices and information on contents viewed by the user.

13. The controlling method of an electronic device of claim 8, wherein the acquiring the plurality of feature values comprises:

receiving the data corresponding to the use history of the user, information on a profile of the user, and information on a product preference of the user from the plurality of external devices; and acquiring, based on the data corresponding to the use history of the user, the information on the profile of the user, and the information on the product preference of the user, the plurality of feature values by dividing the feature values by each of the plurality of time zones.

14. The controlling method of an electronic device of claim 8, wherein the plurality of feature values are acquired in forms of feature vectors after being divided in predetermined period units.

15. An electronic device comprising:

a communication circuitry;

at least one memory storing information associated a trained artificial intelligence learning model for predicting a target device for each time zone from a plurality of time zones for outputting digital information, each time zone associated with a different time interval; and at least one processor configured to:

acquire, from a plurality of external devices, data corresponding to a use history of a user, the use history comprising information on use times of the plurality of external devices;

determine, based on the data corresponding to the use history, a plurality of feature values corresponding to a respective external device from the plurality of external devices by allocation of each feature value from the plurality of feature values to a respective time zone from the plurality of time zones, input the plurality of feature values into the trained artificial intelligence learning model, and acquire, from the trained artificial intelligence learning model, score information for a plurality of probabilities that the plurality of external devices are related to a label by allocation of each probability from the plurality of probabilities to a respective time zone from the plurality of time zones, predict, based on the score information, a plurality of target devices to be used and execute one or more applications by the user for each of the plurality of time zones based on an identification of the external devices having a highest score information for each of the plurality of time zones, and control the communication circuitry to transmit the digital information to the plurality of target devices predicted to be used for each of the plurality of time zones.

16. The electronic device of claim 15, wherein the at least one processor is further configured to:

acquire information on a number of external devices corresponding to the label among the plurality of external devices by allocation each external device from the plurality of external devices to a respective time zone from the plurality of time zones, and identify, based on the score information and the information on the number of the external devices corresponding to the label, the plurality of target devices for each of the plurality of time zones.

17. The electronic device of claim 16, wherein the at least one processor is further configured to:

based on the information on the number of the external devices corresponding to the label, allot a number of target devices to each of the plurality of time zones, and predict the plurality of target devices to be used and execute the one or more applications by the user for each of the plurality of time zones based on an identification of the external devices having the highest score information up to the number of allotted target devices for each of the plurality of time zones.

18. The electronic device of claim 17, wherein the at least one processor is configured to:

identify a time zone from the plurality of time zones having a number of the allotted target devices that is smaller than a predetermined threshold value, and determine the digital information is not to be provided in the identified time zone.

19. The electronic device of claim 15, wherein the data corresponding to the use history of the user comprises information on applications used by the user of the plurality of external devices and information on contents viewed by the user.

20. The electronic device of claim 15, wherein the at least one processor is further configured to:

receive the data corresponding to the use history of the user, information on a profile of the user, and information on a user's product preference through the communication circuitry, and determine, based on the data corresponding to the use history of the user, the information on a profile of the user, and the information on a product preference of the user, the plurality of feature values by allocation of each feature value from the plurality of feature values to a respective time zone from the plurality of time zones.

\* \* \* \* \*